US011226819B2

(12) United States Patent
Emberling et al.

(10) Patent No.: US 11,226,819 B2
(45) Date of Patent: Jan. 18, 2022

(54) SELECTIVE PREFETCHING IN MULTITHREADED PROCESSING UNITS

(71) Applicant: ADVANCED MICRO DEVICES, INC., Sunnyvale, CA (US)

(72) Inventors: Brian Emberling, Sunnyvale, CA (US); Michael Mantor, Orlando, FL (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 508 days.

(21) Appl. No.: 15/818,304

(22) Filed: Nov. 20, 2017

(65) Prior Publication Data

US 2019/0155604 A1 May 23, 2019

(51) Int. Cl.
*G06F 9/30* (2018.01)
*G06F 12/0862* (2016.01)
*G06F 12/0811* (2016.01)

(52) U.S. Cl.
CPC ...... *G06F 9/30047* (2013.01); *G06F 12/0811* (2013.01); *G06F 12/0862* (2013.01); *G06F 2212/283* (2013.01); *G06F 2212/602* (2013.01)

(58) Field of Classification Search
CPC ............ G06F 9/30047; G06F 12/0811; G06F 12/0862; G06F 2212/602; G06F 2212/283
See application file for complete search history.

(56) References Cited

U.S. PATENT DOCUMENTS

| 6,460,115 B1 * | 10/2002 | Kahle | G06F 9/3802 |
| | | | 711/122 |
| 7,873,785 B2 * | 1/2011 | Olukotun | G06F 9/30032 |
| | | | 710/305 |

OTHER PUBLICATIONS

S. Kalogeropulos, M. Rajagopalan, Vikram Rao, Yonghong Song and P. Tirumalai, "Processor Aware Anticipatory Prefetching in Loops," 10th International Symposium on High Performance Computer Architecture (HPCA'04), 2004, pp. 1-10. (Year: 2004).*

* cited by examiner

*Primary Examiner* — William B Partridge
*Assistant Examiner* — Kasim Alli

(57) ABSTRACT

A processing unit includes a plurality of processing elements and one or more caches. A first thread executes a program that includes one or more prefetch instructions to prefetch information into a first cache. Prefetching is selectively enabled when executing the first thread on a first processing element dependent upon whether one or more second threads previously executed the program on the first processing element. The first thread is then dispatched to execute the program on the first processing element. In some cases, a dispatcher receives the first thread four dispatching to the first processing element. The dispatcher modifies the prefetch instruction to disable prefetching into the first cache in response to the one or more second threads having previously executed the program on the first processing element.

20 Claims, 5 Drawing Sheets

SELECTIVE PREFETCHING IN MULTITHREADED PROCESSING UNITS

BACKGROUND

Multi-threaded processing units (such as a graphics processing unit, GPU) typically implement multiple processing elements (or processor cores) that concurrently execute multiple instances of a single program on multiple data sets. The instances are referred to as threads or waves. Several waves are dispatched to each processing element in a multi-threaded processing unit and the processing unit can include hundreds of processing elements so that thousands of waves are concurrently executing programs in the processing unit. As the waves execute, instructions or data are retrieved from memory to be used by the processing elements. Frequently used instructions or data can be stored in a cache hierarchy associated with the processing unit. For example, a GPU can implement a cache hierarchy including private (L0) caches for each of the processing elements, group (L1) caches that are shared by subsets of the processing elements, and a global (L2) cache that is shared by all the processing elements in the GPU. Instructions or data are retrieved (or fetched) from the memory via the cache hierarchy. For example, a processing element can attempt to access an instruction from its L0 cache. If the cache request misses in the L0 cache, the request is forwarded to the L1 cache and so on until the instruction is successfully located in the cache hierarchy or the memory.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
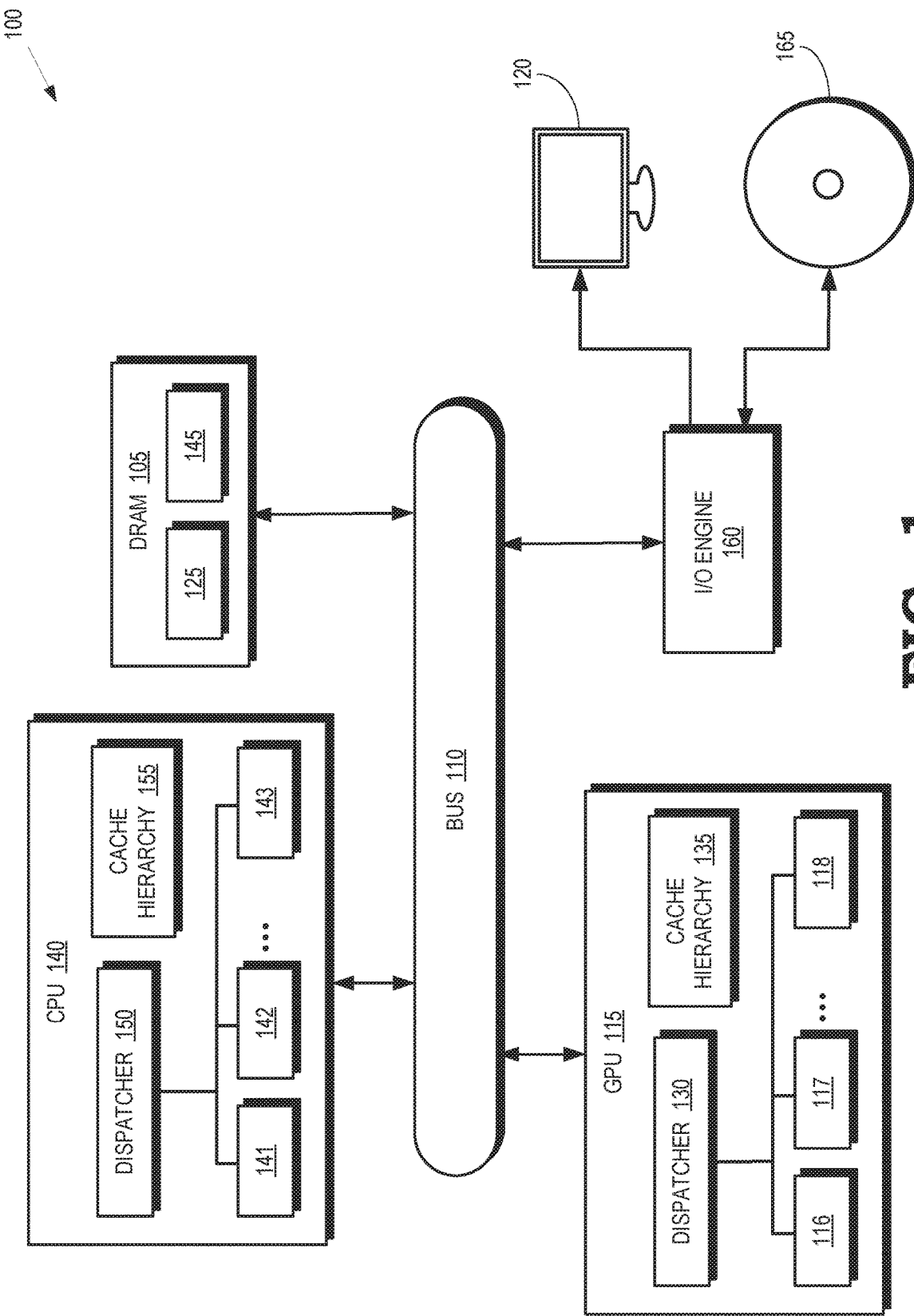
FIG. 1 is a block diagram of a processing system according to some embodiments.

Waves stall if instructions or data are not available in the cache hierarchy when they are needed to execute a program. A frequent cause of stalling is the relatively large latency required to fetch instructions or data from memory if the cache request misses at all levels of the cache hierarchy, which can cause a program to stall while it is waiting for the required instructions or data to be fetched from the memory. The program therefore includes prefetch instructions that cause the processing element to make a prefetch request to the cache for instructions or data, which are then prefetched from the memory so that the instructions or data are available in the cache hierarchy before the instructions or data are needed by the program. However, if multiple waves are running the same program (i.e., the same sequence of instructions) using the same or different data, the multiple waves will prefetch the same instructions or data into the cache hierarchy, which can create a bottleneck by flooding the cache system with redundant prefetches. The bottleneck caused by redundant prefetches can reduce or eliminate the advantages of prefetching.

Redundant prefetches in multithreaded processing units is reduced or avoided using a dispatcher that tracks programs that have been dispatched for execution on processing elements in a processing unit. The dispatcher selectively enables prefetching by a wave that is running a program based on whether another wave running the same program was previously dispatched for execution. Some embodiments of the dispatcher maintain a table including an entry for each program and information indicating the processing element that executed the program. For example, the information in an entry for a shader program executed by processing elements (e.g., shader engines) in a graphics processing unit (GPU) can include an identifier of a shader engine, an identifier of a shader array, or an identifier of a workgroup processor. Selectively enabling prefetching by the wave includes enabling the wave to issue prefetch instructions in response to determining that the wave is the first wave to run the program on the processing unit. Selectively enabling prefetching by the wave also includes disabling prefetch instructions in response to determining that at least one wave previously ran the program on the processing unit.

Some embodiments of the dispatcher selectively enable prefetching by the wave into different levels of a cache hierarchy based on whether another wave running the same program was previously dispatched for execution by a processing element in a group of processing elements that corresponds to a level of the cache hierarchy. For example, the dispatcher enables prefetching by the wave into a private (L0) cache if the wave is the first wave to run the program on the processing element associated with the private cache. The dispatcher enables prefetching by the wave into a group (L1) cache that is shared by a subset of the processing elements if the wave is the first wave to run the program on any of the processing elements in the subset. The dispatcher enables prefetching by the wave into a global (L2) cache that is shared by all the processing elements in the processing unit if the wave is the first wave to run the program on any of the processing elements in the processing unit. The dispatcher can also disable prefetching into the levels of the cache hierarchy if another wave previously ran the program on the corresponding group of processing elements. In some embodiments, higher level caches such as the L1 cache or the L2 cache filters redundant prefetches that originate from multiple processing elements in response to prefetch instructions in different waves that execute the same program. Filtering the redundant prefetches allows the higher-level cache to avoid passing multiple cache-miss requests to higher level caches.

FIG. 1 is a block diagram of a processing system 100 according to some embodiments. The processing system 100 includes or has access to a memory 105 or other storage component that is implemented using a non-transitory computer readable medium such as a dynamic random access memory (DRAM). However, the memory 105 can also be implemented using other types of memory including static random access memory (SRAM), nonvolatile RAM, and the like. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes a graphics processing unit (GPU) 115 that is configured to render images for presentation on a display 120. For example, the GPU 115 can render objects to produce values of pixels that are provided to the display 120, which uses the pixel values to display an image that represents the rendered objects. Some embodiments of the GPU 115 are used for general purpose computing. In the illustrated embodiment, the GPU 115 implements multiple processing elements 116, 117, 118 (collectively referred to herein as "the processing elements 116-118") that are configured to execute instructions concurrently or in parallel. The processing elements 116-118 can also be referred to as shader engines. In the illustrated embodiment, the GPU 115 communicates with the memory 105 over the bus 110. However, some embodiments of the GPU 115 communicate with the memory 105 over a direct connection or via other buses, bridges, switches, routers, and the like. The GPU 115 executes instructions stored in the memory 105 and the GPU 115 stores information in the memory 105 such as the results of the executed instructions. For example, the memory 105 can store a copy 125 of instructions from a program code that is to be executed by the GPU 115.

The GPU 115 includes a dispatcher 130 that is configured to dispatch instructions for execution by the processing elements 116-118. Some embodiments of the dispatcher 130 dispatch instructions in waves. As used herein, the term "wave" or "wavefront" refers to a collection of threads or data elements executing one or more instructions such as instructions that make up a program or a subset of a program in a single instruction multiple data (SIMD) manner, i.e., the same instruction is executed on different datasets for different waves. For the sake of clarity, processing units are assumed to be executing SIMD waves in the following discussion. However, the techniques disclosed herein are equally applicable to non-SIMD computing scenarios such as multiple CPU threads that execute the same set of instructions.

Different waves can include different instances of the same instructions or subsets of instructions, which operate on the same data or different data. For example, the dispatcher 130 can dispatch multiple waves that execute the same instructions on one or more of the processing elements 116-118. The GPU 115 also implements a cache hierarchy 135 that includes one or more levels of caches that are used to cache instructions or data for relatively low latency access by the processing elements 116-118. The instructions that are dispatched to the processing elements 116-118 in waves include one or more prefetch instructions that are used to prefetch information such as instructions or data into the cache hierarchy 135. For example, a prefetch instruction executed by a wave on the processing element 116 prefetches an instruction from the copy 125 so that the instruction is available in the cache hierarchy 135 prior to the processing element 116 executing the instruction. Although the cache hierarchy 135 is depicted as external to the processing elements 116-118, some embodiments of the processing elements 116-118 incorporate corresponding caches (such as L0 caches) that are interconnected to the cache hierarchy 135.

The processing system 100 also includes a central processing unit (CPU) 140 that implements multiple processing elements 141, 142, 143, which are collectively referred to herein as "the processing elements 141-143." The processing elements 141-143 are configured to execute instructions concurrently or in parallel. For example, the processing elements 141-143 are configured to execute multiple threads concurrently or in parallel. The CPU 140 is connected to the bus 110 and therefore communicates with the GPU 115 and the memory 105 via the bus 110. The CPU 140 executes instructions such as program code 145 stored in the memory 105 and the CPU 140 stores information in the memory 105 such as the results of the executed instructions. The CPU 140 is also able to initiate graphics processing by issuing draw calls to the GPU 115.

Some embodiments of the CPU 140 include a dispatcher 150 that is configured to dispatch instructions for execution by the processing elements 141-143. As discussed herein, the dispatcher 150 dispatches instructions in waves, which can include different instances of the same instructions or subsets of instructions, which operate on the same data or different data. For example, the dispatcher 150 dispatches multiple waves that execute the same instructions on one or more of the processing elements 141-143. The CPU 140 also implements a cache hierarchy 155 that includes one or more levels of caches that are used to cache instructions or data for relatively low latency access by the processing elements 141-143. Although the cache hierarchy 155 is depicted as external to the processing elements 141-143, some embodiments of the processing elements 141-143 incorporate corresponding caches that are interconnected to the cache hierarchy 155. In some embodiments, the instructions that are dispatched in waves to the processing elements 141-143 include one or more prefetch instructions that are used to prefetch information such as instructions or data into the cache hierarchy 155. For example, a prefetch instruction executed by a wave on the processing element 141 can prefetch an instruction from the program code 145 so that the instruction is available in the cache hierarchy 155 prior to the processing element 141 executing the instruction.

An input/output (I/O) engine 160 handles input or output operations associated with the display 120, as well as other elements of the processing system 100 such as keyboards, mice, printers, external disks, and the like. The I/O engine 160 is coupled to the bus 110 so that the I/O engine 160 is able to communicate with the memory 105, the GPU 115, or the CPU 140. In the illustrated embodiment, the I/O engine 160 is configured to read information stored on an external storage component 165, which is implemented using a non-transitory computer readable medium such as a compact disk (CD), a digital video disc (DVD), and the like. The I/O engine 160 can also write information to the external storage component 165, such as the results of processing by the GPU 115 or the CPU 140.

As discussed herein, multiple waves are running the same program on the processing elements 116-118 of the GPU 115 or the processing elements 141-143 of the CPU 140 prefetch the same instructions or data into the corresponding cache hierarchy is 135, 155, which can create a bottleneck by flooding the cache system with redundant prefetches. The dispatchers 130, 150 are therefore configured to track programs that have been dispatched for execution on the corresponding processing elements 116-118, 141-143. The dispatchers 130, 150 selectively enable prefetching by a wave that is running a program based on whether another wave running the same program was previously dispatched for execution. For example, the dispatcher 130 disables prefetching by a wave that is executing a program on the processing element 116 in response to determining that a previous wave executed the same program on the processing element 116. In some embodiments, the dispatcher 130 disables prefetching by modifying prefetch instructions in the program code that is executed by the wave. The modifiable prefetch instructions can be referred to as "conditional shader prefetch instructions" if they are used to implement a shader engine in the GPU 115.

Figure 2:
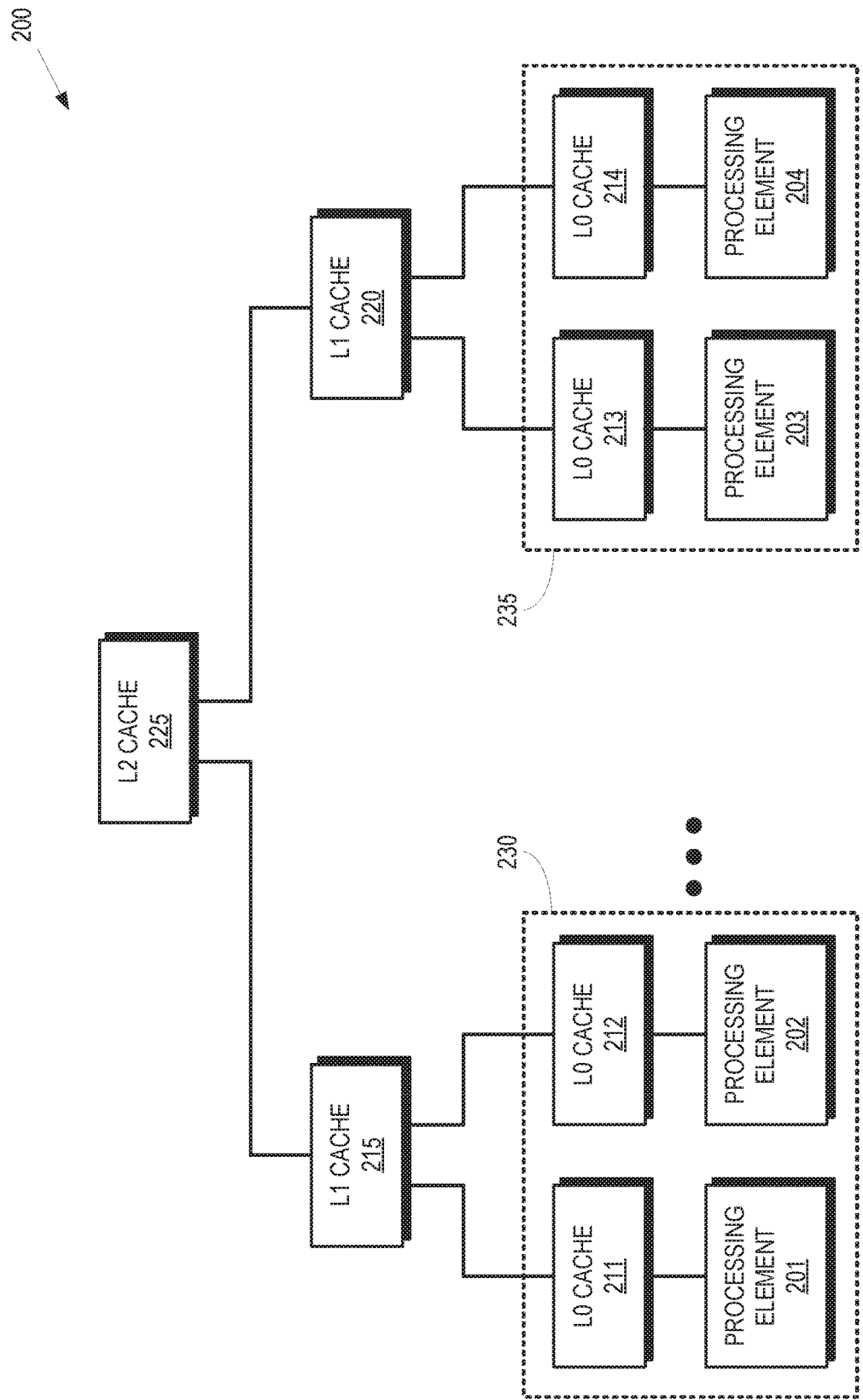
FIG. 2 is a block diagram of a cache hierarchy according to some embodiments.

FIG. 2 is a block diagram of a cache hierarchy 200 according to some embodiments. The cache hierarchy 200 is used to implement some embodiments of the cache hierarchy 135 in the GPU 115 and some embodiments of the cache hierarchy 155 in the CPU 140 shown in FIG. 1. The cache hierarchy 200 caches information such as instructions or data for processing elements 201, 202, 203, 204, which are collectively referred to herein as "the processing elements 201-204." The processing elements 201-204 are used to implement some embodiments of the processing elements 116-118, 141-143 shown in FIG. 1.

The cache hierarchy 200 includes three levels of caches: a first level including L0 caches 211, 212, 213, 214 (collectively referred to herein as "the L0 caches 211-214"), a second level including L1 caches 215, 220, and a third level including an L2 cache 225. However, some embodiments of the cache hierarchy 200 include more or fewer levels of caches. Although the L0 caches 211-214 are depicted as separate hardware structures that are interconnected to the corresponding processing elements 201-204, some embodiments of the L0 caches 211-214 are incorporated into the hardware structures that implement the processing elements 201-204.

The L0 caches 211-214 are used to cache information for access by the corresponding processing elements 201-204. For example, the L0 cache 211 is configured to cache information for the processing element 201. The processing element 201 can therefore issue memory access requests to the L0 cache 211. The requested information is returned if the memory access request hits in the L0 cache 211. The L0 cache 211 forwards the memory access request to the next higher cache level (e.g., the L1 cache 215) if the memory access request misses in the L0 cache 211. The information cached in the L0 cache 211 is not typically accessible by the other processing elements 202-204.

The processing elements 201-204 are grouped into subsets 230, 235 and the subsets 230, 235 are associated with corresponding L1 caches 215, 220. The L1 caches 215, 220 are therefore configured to cache information for the processing elements 201-204 in the subsets 230, 235. For example, the L1 cache 215 caches information for the processing elements 201, 202. As discussed above, if one of the processing elements 201, 202 issues a memory access request that misses in the corresponding L0 cache 211, 212, the memory access request is forwarded to the L1 cache 215. The requested information is returned to the requesting processing element 201, 202 if the memory access request hits in the L1 cache 215. The L1 cache 215 forwards the memory access requests to the next higher level of the cache (e.g., the L2 cache 225) if the memory access request misses in the L1 cache 215.

The L2 cache 225 is configured as a global cache for the processing elements 201-204. Memory access requests from the processing elements 201-204 that miss in the L1 caches 215, 220 are forwarded to the L2 cache 225. The requested information is returned to the requesting processing element 201-204 if the memory access request hits in the L2 cache 225. The L2 cache 225 forwards the memory access request to a memory system such as the memory 105 shown in FIG. 1 if the memory access requests misses in the L2 cache 225.

Some embodiments of the L1 caches 215, 220 and the L2 cache 225 are configured to filter redundant memory access requests received from lower level caches. For example, if the L1 cache 215 receives memory access requests from both of the L0 caches 211, 212 for the same information stored at the same memory address, the L1 cache 215 can filter the requests by dropping one of the memory access requests and forwarding the other memory access request to the L2 cache 225 in the event of a cache miss in the L1 cache 215. In response to receiving the requested information, the L1 cache 215 can then populate both the L0 caches 211, 212 with the requested information. For another example, if the L2 cache 225 receives memory access requests for information sort of the same memory address in response to misses in the L1 caches 215, 220 and if the memory access requests miss in the L2 cache 225, the L2 cache 225 can filter the requests by dropping one of the memory access requests and forwarding the other memory access request to a memory system such as the memory 105 shown in FIG. 1.

Figure 3:
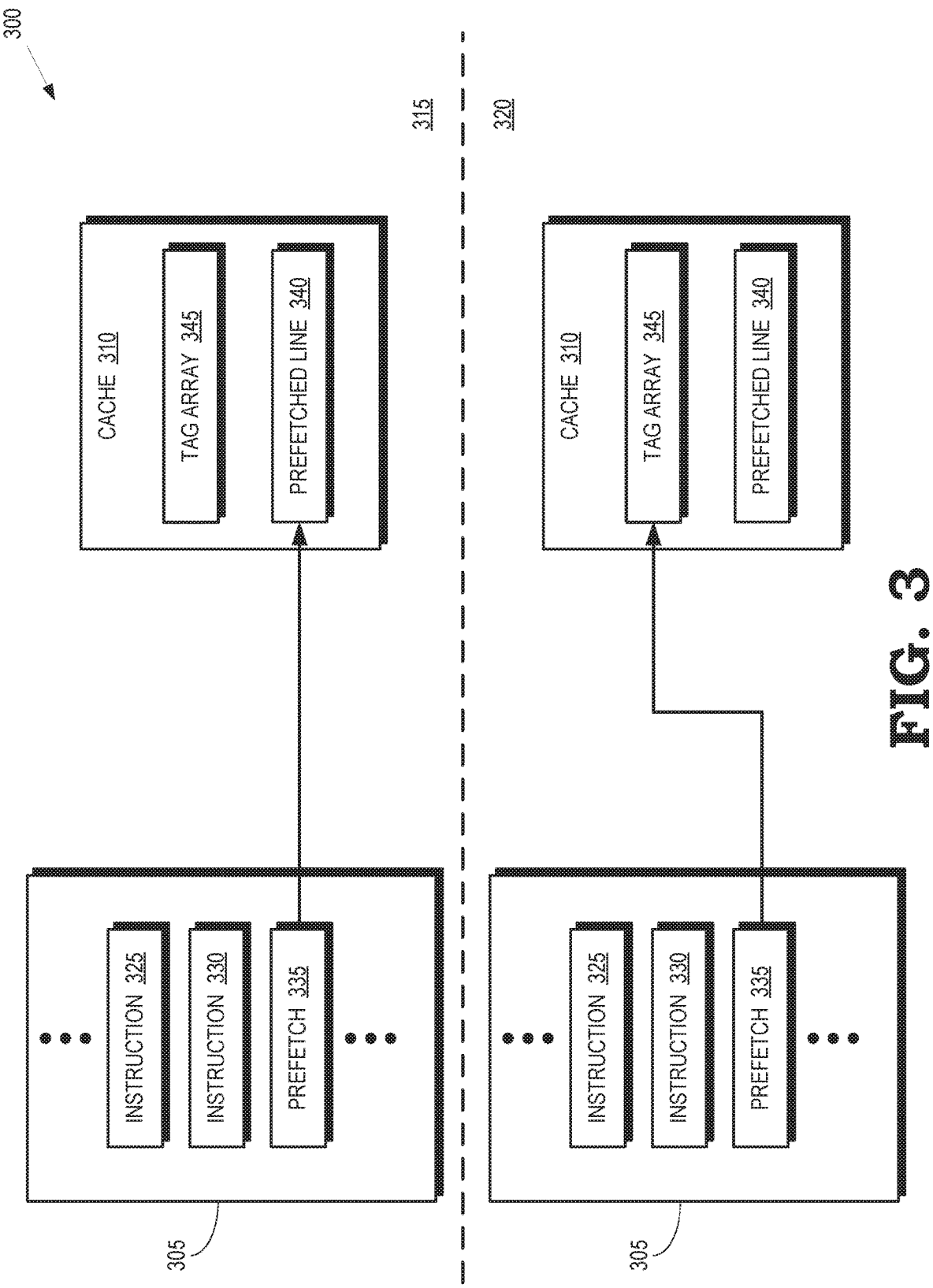
FIG. 3 is a block diagram illustrating redundant prefetching in a processing unit that handles multiple waves executing the same program according to some embodiments.

FIG. 3 is a block diagram illustrating redundant prefetching in a processing system 300 that handles multiple waves executing the same program according to some embodiments. The processing system 300 represents some embodiments of the GPU 115 or the CPU 140 in the processing system 100 shown in FIG. 1. The processing system 300 includes a processing element 305 that is configured to execute programs that are part of waves that are allocated to the processing element 305, e.g., by some embodiments of the dispatchers 130, 150 shown in FIG. 1. The processing system 300 also includes a cache 310 that caches information such as instructions or data that are prefetched in response to prefetch instructions executed by the processing element 305. The cache 310 represents some embodiments of the L0 caches 211-214, the L1 caches 215, 220, or the L2 cache 225.

The state of the processing system 300 is shown at a first time interval 315 and a second (subsequent) time interval 320. In the first time interval 315, the processing element 305 is processing a first wave that executes a first program including instruction 325, instruction 330, and prefetch instruction 335. The processing element 305 executes the instructions 325, 330 and, in response to executing the prefetch instruction 335, the processing element 305 causes a line 340 to be prefetched into the cache 310. The line 340 can include one or more instructions that are to be subsequently executed by the processing element 305 or data that is to be accessed by instructions that are to be subsequently executed by the processing element 305. A tag array 345 or the cache 310 is updated to include a tag for the line 340.

In the second time interval 320, the processing element 305 is processing a second wave that also executes the first program including the instructions 325, 330 and the prefetch instruction 335. If the processing element 305 executes the prefetch instruction 335 as part of the second wave, the system will be required to access the tag array 345 to perform a tag check and determine whether the line 340 is already resident in the cache 310. The tag check consumes significant time and resources, and doing a tag check for a prefetch request takes the place of performing a tag check for a non-prefetch request.

To avoid redundant prefetching and the associated costs, the processing system 300 is configured to selectively enable prefetching by instructions in a program executed by a wave dependent upon whether the same program has been executed by a previous wave. Some embodiments of the processing system 300 track whether any previous waves have executed a program on the processing element 305 prior to a currently allocated wave executing the program on the processing element 305. If not, prefetching is enabled for instructions in the program for the currently allocated wave. Prefetching is disabled if one or more previous waves have executed the program on the processing element 305. In the illustrated embodiment, no waves executed the program including the instructions 325, 330, 335 on the processing element 305 prior to the first wave and so prefetching is enabled. The prefetch instruction 335 therefore causes the line 340 to be prefetched into the cache 310. The second (subsequent) wave executes the same program including the same instructions 325, 330, 335 on the processing element 305. Prefetching is therefore disabled for the second wave and the prefetch instruction 335 does not cause a redundant copy of the line 340 to be prefetched into the cache 310, as indicated by the dashed box.

Figure 4:
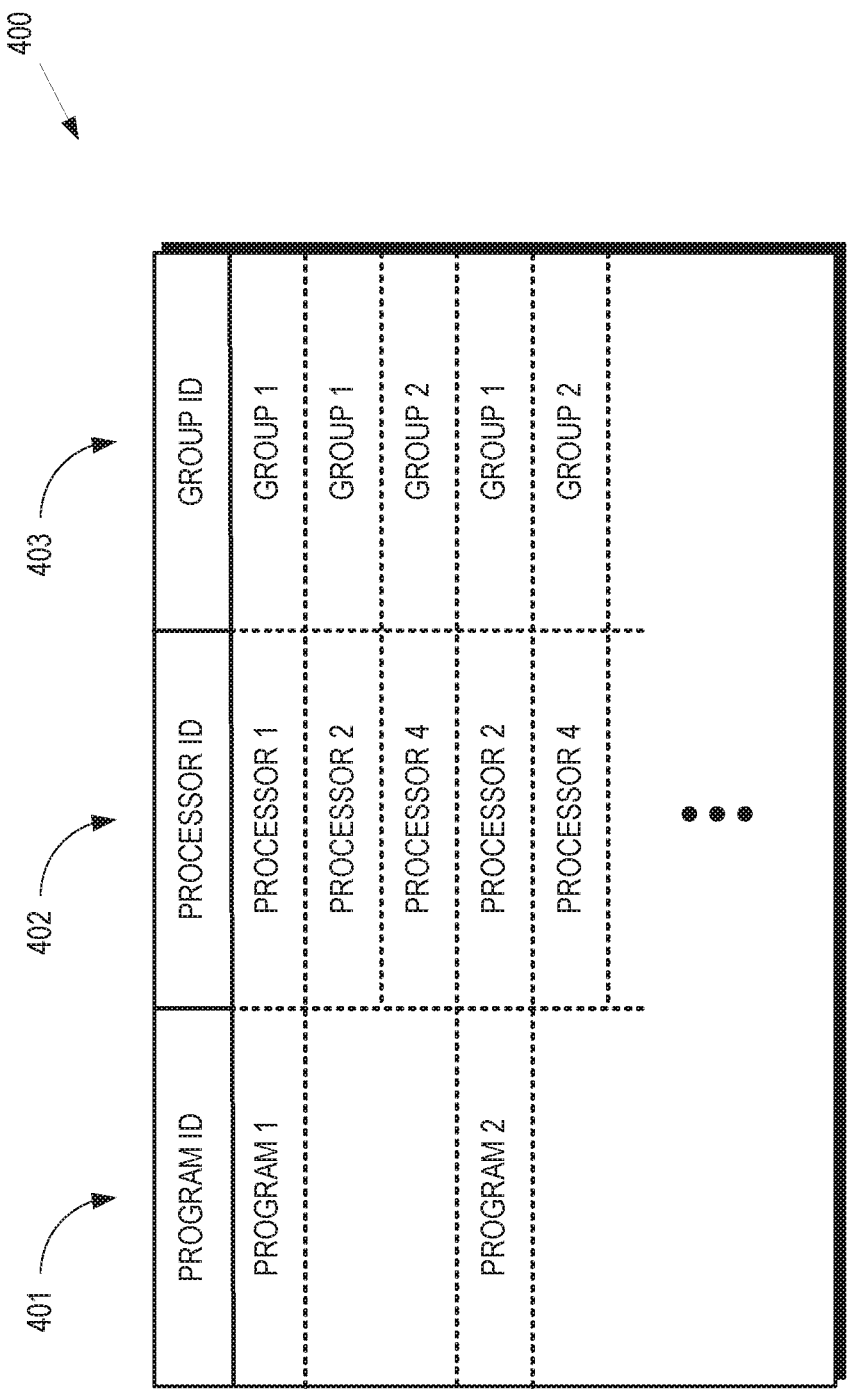
FIG. 4 is a block diagram of a table that stores information identifying processors that have previously executed programs according to some embodiments.

FIG. 4 is a block diagram of a table 400 that stores information identifying processors that have previously executed programs according to some embodiments. The table 400 is implemented in some embodiments of the processing system 100 shown in FIG. 1. For example, the table 400 is stored in the memory 105 and accessed by the processing elements 116-118, 141-143 shown in FIG. 1.

A first column 401 of the table 400 stores program identifiers. For example, a first row in the first column 401 stores an identifier of a first program and a fourth row in the first column 401 stores an identifier of a second program.

A second column 402 of the table 400 stores identifiers of the processors (e.g., the processing elements 116-118, 141-143) that previously executed the corresponding programs. For example, the first row of the second column 402 stores information identifying a first processor that previously executed the first program, the second row of the second column 402 stores information identifying a second processor that previously executed the first program, the third row of the second column 402 stores information identifying a fourth processor that previously executed the first program. For another example, the fourth row of the second column 402 stores information identifying the second processor that previously executed the second program and the fifth row of the second column 402 stores information identifying the fourth processor that previously executed the second program.

A third column 403 stores information identifying groups that include the processors that executed the corresponding program. The first and second processors are in a first group and so the first and second rows of the third column 403 store information identifying the first group. The fourth processor is in a second group and so the third row of the third column 403 stores information identifying the second group. The fourth row of the third column 403 stores information identifying the first group (that includes the second processor) and the fifth row of the third column 403 stores information identifying the second group (that includes the fourth processor).

A processing system such as the processing system 100 shown in FIG. 1 uses embodiments of the table 400 to selectively enable prefetching into a cache associated with a processing element such as the L0 caches 211-214 shown in FIG. 2. For example, before dispatching a wave that executes the first program to the first processor, a dispatcher such as the dispatchers 130, 150 shown in FIG. 1 accesses the table 400 and determines that a previous wave has already executed the first program on the first processor. The dispatcher therefore disables prefetching by the first program in the wave. For another example, before dispatching a wave that executes the first program on a third processor, the dispatcher accesses the table 400 and determines that no previous wave has executed the first program on the third processor. The dispatcher therefore enables prefetching by the first program executed by the wave.

Some embodiments of the processing system use embodiments of the table 400 to selectively enable prefetching into caches that store information for a group or subset of processing elements such as the L1 caches 215, 220 or the L2 cache 225 shown in FIG. 2. For example, before dispatching a wave that executes the second program on the first processor, the dispatcher accesses the table 400 and determines that a previous wave has executed the second program on a processor (the second processor) that is a part of the first group. The dispatcher therefore disables prefetching into the cache that stores information for the first group. In some cases, the dispatcher enables prefetching into a lower level cache that stores information for the first processor because the table 400 indicates that no previous wave executed the second program on the first processor.

Figure 5:
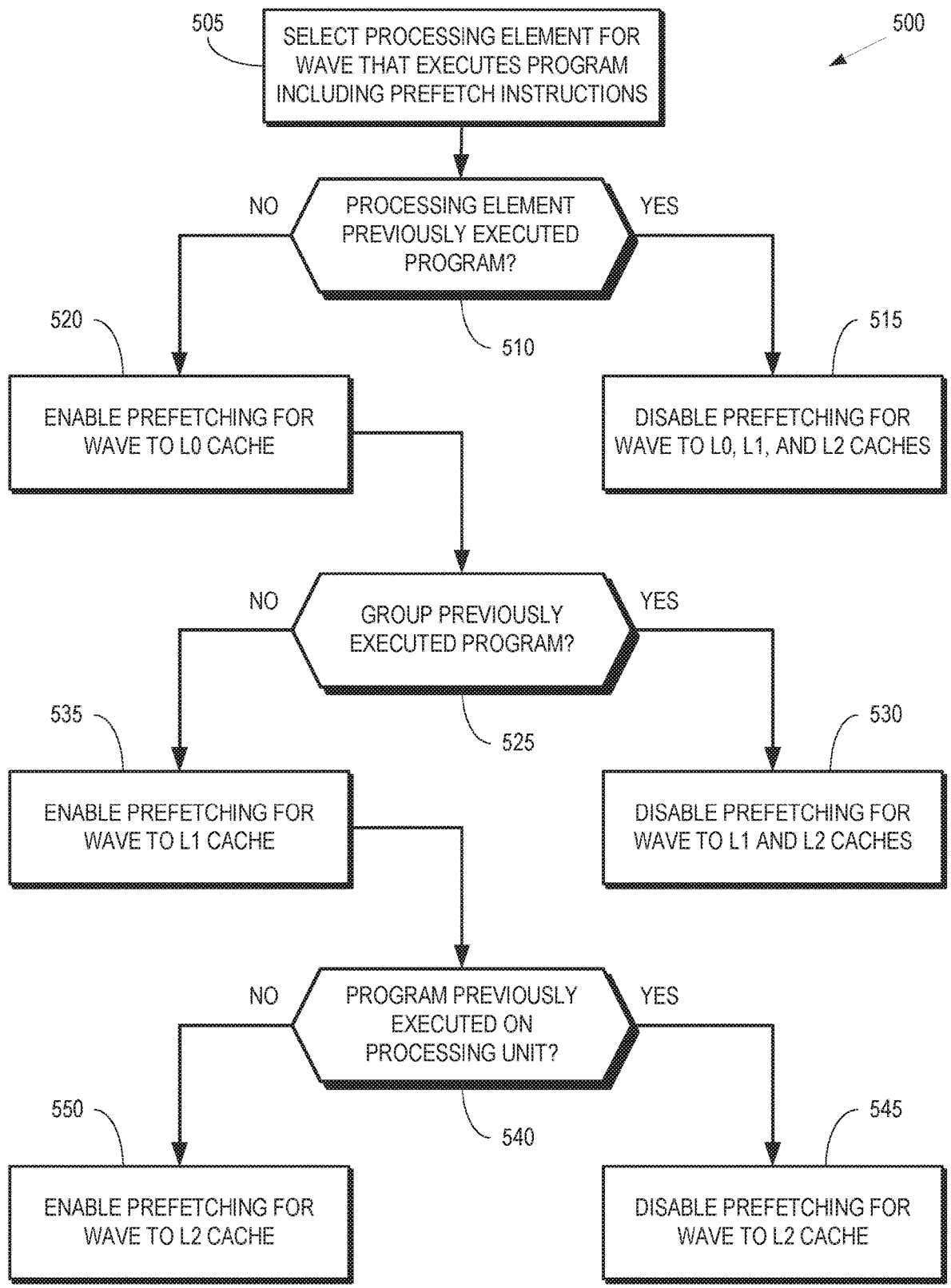
FIG. 5 is a flow diagram of a method for selectively enabling prefetching for a program dependent upon whether a previously executed program included the same prefetch instructions according to some embodiments.

FIG. 5 is a flow diagram of a method 500 for selectively enabling prefetching for a program dependent upon whether a previously executed program included the same prefetch instructions according to some embodiments. The method 500 is implemented in some embodiments of the GPU 115 and the CPU 140 shown in FIG. 1, the cache hierarchy 200 shown in FIG. 2, and the processing system 300 shown in FIG. 3. For example, the method 500 is performed by a dispatcher such as the dispatchers 130, 150 shown in FIG. 1. In the illustrated embodiment, the processing unit that implements the method 500 includes a cache hierarchy made up of a plurality of caches, which are organized into a first layer of L0 caches that each cache information for one of the processing elements in the processing unit, a second layer of L1 caches to cache information for subsets of the processing elements in the processing unit, and a third layer that includes an L2 cache to cache information for all of the processing elements in the processing unit.

At block 505, the dispatcher selects one of the processing elements for a wave that executes a program including one or more prefetch instructions.

At decision block 510, the dispatcher determines whether the processing element previously executed the same program. Some embodiments of the dispatcher access a table such as the table 400 that includes information identifying programs that have been previously executed on processing elements or subsets of the processing elements in the processing unit. If the processing element previously executed the same program, e.g., as part of a wave that was previously allocated to the processing element, the method 500 flows to block 515. If the program has not been previously executed on the processing elements, the method 500 flows to block 520.

At block 515, the dispatcher disables prefetching for the L0 cache that stores information for the processing element because this information is likely still cached in the L0 cache because it was previously prefetched into the L0 cache by the previously executed instance of the program. In the illustrated embodiment, a cache coherence protocol requires that the prefetched information stored in the L0 cache is also stored in the corresponding L1 cache and L2 cache. The dispatcher therefore disables prefetching into the L1 cache and the L2 cache associated with the processing elements. However, in other cases, prefetching into the L1 cache or the L2 cache is not necessarily disabled. In some embodiments, disabling prefetching into the L0 cache, L1 cache, or L2 cache is performed by modifying the prefetch instructions in the program, e.g., by setting values of flags in the prefetch instructions (or otherwise encoding the prefetch instruction)

to indicate that prefetching has been disabled for the L0 cache, the L1 cache, or the L2 cache.

At block 520, the dispatcher enables prefetching for the L0 cache that stores information for the processing element because it is unlikely that this information was previously prefetched into the L0 cache. In some embodiments, enabling prefetching into the L0 cache is performed by modifying the prefetch instructions in the program, e.g., by setting a value of a flag in the prefetch instruction (or otherwise encoding the prefetch instruction) to indicate that prefetching is enabled for the L0 cache. The method 500 then flows to decision block 525.

At decision block 525, the dispatcher determines whether at least one other processing element in the group that includes the processing element previously executed the program, e.g., by accessing a table such as the table 400 shown in FIG. 4 that identifies groups that previously executed one or more programs. If another processing element in the group previously executed the program, the method 500 flows to block 530. If no other processing elements in the group previously executed the program, the method 500 flows to block 535.

At block 530, the dispatcher disables prefetching for the L1 cache that stores information for the group of processing elements because this information is likely still cached in the L1 cache because it was previously prefetched into the L1 cache by a previously executed instance of the program. In the illustrated embodiment, a cache coherence protocol requires that the prefetched information stored in the L1 cache is also stored in the L2 cache. The dispatcher therefore disables prefetching into the L2 cache. In some embodiments, disabling prefetching into the L1 cache and L2 cache is performed by modifying the prefetch instructions in the program, e.g., by setting values of flags in the prefetch instructions (or otherwise encoding the prefetch instruction) to indicate that prefetching has been disabled for the L1 cache and the L2 cache.

At block 535, the dispatcher enables prefetching for the L1 cache that stores information for the group because it is unlikely that this information was previously prefetched into the L1 cache. In some embodiments, enabling prefetching into the L1 cache is performed by modifying the prefetch instructions in the program, e.g., by setting a value of a flag in the prefetch instruction (or otherwise encoding the prefetch instruction) to indicate that prefetching is enabled for the L1 cache. The method 500 then flows to decision block 540.

At decision block 540, the dispatcher determines whether at least one other processing element in the processing unit previously executed the program, e.g., by accessing a table such as the table 400 shown in FIG. 4 that identifies the programs that were previously executed by the processing elements in the processing unit. If any processing element in the processing unit previously executed the program, the method 500 flows to block 545. If no processing elements in the processing unit previously executed the program, the method 500 flows to block 550.

At block 545, the dispatcher disables prefetching for the L2 cache because this information is likely still cached in the L2 cache because it was previously prefetched into the L2 cache by a previously executed instance of the program. In some embodiments, disabling prefetching into the L2 cache is performed by modifying the prefetch instructions in the program, e.g., by setting values of flags in the prefetch instructions (or otherwise encoding the instruction) to indicate that prefetching has been disabled for the L2 cache.

At block 550, the dispatcher enables prefetching for the L2 cache because it is unlikely that this information was previously prefetched into the L2 cache. In some embodiments, enabling prefetching into the L2 cache is performed by modifying the prefetch instructions in the program, e.g., by setting a value of a flag in the prefetch instruction (or otherwise encoding the prefetch instruction) to indicate that prefetching is enabled for the L2 cache.

In some embodiments, the apparatus and techniques described above are implemented in a system comprising one or more integrated circuit (IC) devices (also referred to as integrated circuit packages or microchips), such as the processing system that selectively enables prefetching into caches as described above with reference to FIGS. 1-5. Electronic design automation (EDA) and computer aided design (CAD) software tools are used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code includes instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium includes any non-transitory storage medium, or combination of non-transitory storage media, accessible by a computer system during use to provide instructions and/or data to the computer system. Such storage media includes, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium includes, for example, a magnetic or optical disk storage device, solid state storage devices such as Flash memory, a cache, random access memory (RAM) or other non-volatile memory device or devices, and the like. The executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device may not be required, and that one or more further activities are performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   selectively enabling, at a processing unit that comprises a first processing element, prefetching, into a first cache, for a first thread that executes a program on the first processing element dependent upon whether at least one second thread previously executed the program on the first processing element, wherein the program includes at least one prefetch instruction to prefetch information into the first cache; and
   dispatching the first thread to execute the program on the first processing element.

2. The method of claim 1, wherein selectively enabling prefetching for the first thread comprises disabling prefetching for the first thread in response to the at least one second thread having previously executed the program on the first processing element.

3. The method of claim 1, wherein selectively enabling prefetching for the first thread comprises enabling prefetching for the first thread in response to the at least one second thread not having previously executed the program on the first processing element.

4. The method of claim 3, wherein the processing unit comprises a cache hierarchy that includes the first cache to cache information for the first processing element, a second cache configured to cache information for a subset of a plurality of processing elements of the processing unit that includes the first processing element, and a third cache configured to cache information for the plurality of processing elements.

5. The method of claim 4, further comprising:
   disabling prefetching into the first cache, the second cache, and the third cache in response to the at least one second thread having previously executed the program on the first processing element.

6. The method of claim 5, further comprising:
   enabling prefetching to the second cache in response to the at least one second thread not having previously executed the program in the subset of the plurality of processing elements; and
   disabling prefetching into the second cache and the third cache in response to the at least one second thread having previously executed the program in the subset of the plurality of processing elements.

7. The method of claim 6, further comprising:
   enabling prefetching to the third cache in response to the at least one second thread not having previously executed the program on the plurality of processing elements; and
   disabling prefetching into the third cache in response to the at least one second thread having previously executed the program on at least one of the plurality of processing elements of the processing unit.

8. The method of claim 4, further comprising:
   selectively forwarding a prefetch request from the second cache to the third cache dependent on whether the same prefetch request was previously received from another cache.

9. An apparatus comprising:
   a first processing element; and
   a dispatcher configured to selectively enable prefetching, into a first cache, for a first thread that executes a program on the first processing element dependent upon whether at least one second thread previously executed the program on the first processing element and to dispatch the first thread to execute the program on the first processing element, wherein the program includes at least one prefetch instruction to prefetch information into the first cache.

10. The apparatus of claim 9, wherein the dispatcher is configured to disable prefetching for the first thread in response to the at least one second thread having previously executed the program on the first processing element.

11. The apparatus of claim 9, wherein the dispatcher is configured to enable prefetching for the first thread in response to the at least one second thread not having previously executed the program on the first processing element.

12. The apparatus of claim 11, wherein the plurality of caches is configured as a cache hierarchy that includes the first cache to cache information for the first processing element, a second cache configured to cache information for a subset of a plurality of processing elements of the apparatus that includes the first processing element, and a third cache configured to cache information for the plurality of processing elements.

13. The apparatus of claim 12, wherein the dispatcher is configured to disable prefetching into the first cache, the second cache, and the third cache in response to the at least one second thread having previously executed the program on the first processing element.

14. The apparatus of claim 13, wherein the dispatcher is configured to enable prefetching to the second cache in response to the at least one second thread not having previously executed the program in the subset of the plurality of processing elements and wherein the dispatcher is configured to disable prefetching into the second cache and the third cache in response to the at least one second thread having previously executed the program in the subset of the plurality of processing elements.

15. The apparatus of claim 14, wherein the dispatcher is configured to enable prefetching to the third cache in response to the at least one second thread not having previously executed the program on the plurality of processing elements and wherein the dispatcher is configured to disable prefetching into the third cache in response to the at least one second thread having previously executed the program on at least one of the plurality of processing elements.

16. The apparatus of claim 14, wherein the second cache is configured to selectively forward a prefetch request to the third cache dependent on whether the same prefetch request was previously received from another cache.

17. A method comprising:
receiving, at a dispatcher for a processing unit that comprises first processing element, a first thread that executes a program in the first processing element, wherein the program includes a prefetch instruction to fetch information into a first cache;
selectively enabling prefetching for the first thread;
modifying, at the dispatcher, the prefetch instruction to disable prefetching into the first cache in response to at least one second thread having previously executed the program on the first processing element; and
dispatching, from the dispatcher, the first thread to execute the program on the first processing element.

18. The method of claim 17, wherein the first cache is one of a plurality of caches that are configured as a cache hierarchy that includes the first cache to cache information for the first processing element, a second cache configured to cache information for a subset of a plurality of processing elements of the processing unit that includes the first processing element, and a third cache configured to cache information for the plurality of processing elements of the processing unit, and wherein the dispatcher is configured to modify the prefetch instruction to disable prefetching into the first cache, the second cache, and the third cache in response to the at least one second thread having previously executed the program on the first processing element.

19. The method of claim 18, wherein the dispatcher is configured to modify the prefetch instruction to disable prefetching into the second cache and the third cache in response to the at least one second thread having previously executed the program in the subset of the plurality of processing elements.

20. The method of claim 18, wherein the dispatcher is configured to modify the prefetch instruction to disable prefetching into the third cache in response to the at least one second thread having previously executed the program on at least one of the plurality of processing elements of the processing unit.

* * * * *

UNITED STATES PATENT AND TRADEMARK OFFICE
CERTIFICATE OF CORRECTION

PATENT NO. : 11,226,819 B2
APPLICATION NO. : 15/818304
DATED : January 18, 2022
INVENTOR(S) : Brian Emberling and Michael Mantor It is certified that error appears in the above-identified patent and that said Letters Patent is hereby corrected as shown below:

In the Claims

At Column 11 Line 66, in Claim 4, please replace "the" with "a" after "for" and before "plurality"

At Column 11 Line 67, in Claim 4, please insert --of the processing unit-- after "elements" and before "."

At Column 12 Line 50, in Claim 12, please delete "wherein the" after "11," and insert --further comprising: a--

At Column 12 Line 57, in Claim 12, please insert --of the apparatus-- after "elements" and before "."

At Column 13 Line 20, in Claim 17, please insert --a-- before "first"

Signed and Sealed this
Twenty-first Day of March, 2023

Katherine Kelly Vidal
*Director of the United States Patent and Trademark Office*